United States Patent Office 3,809,567
Patented May 7, 1974

3,809,567
POLYCHLOROPRENE RUBBERS
George Alexander Rohan, Esher, England, assignor to Kappa Holding A.G., Zug, Switzerland
Filed Jan. 10, 1972, Ser. No. 216,441
Claims priority, application Great Britain, Jan. 12, 1971, 1,521/71
Int. Cl. C09c 1/02
U.S. Cl. 106—306  4 Claims

ABSTRACT OF THE DISCLOSURE

An additive for incorporation in polychloroprene rubber which comprises a physical mixture of magnesium oxide and an inert diluent powder which is compatible with polychloroprene rubber, the mixture containing 10 to 850 parts by weight of diluent powder per 100 parts by weight of magnesium oxide.

---

Figure 1:
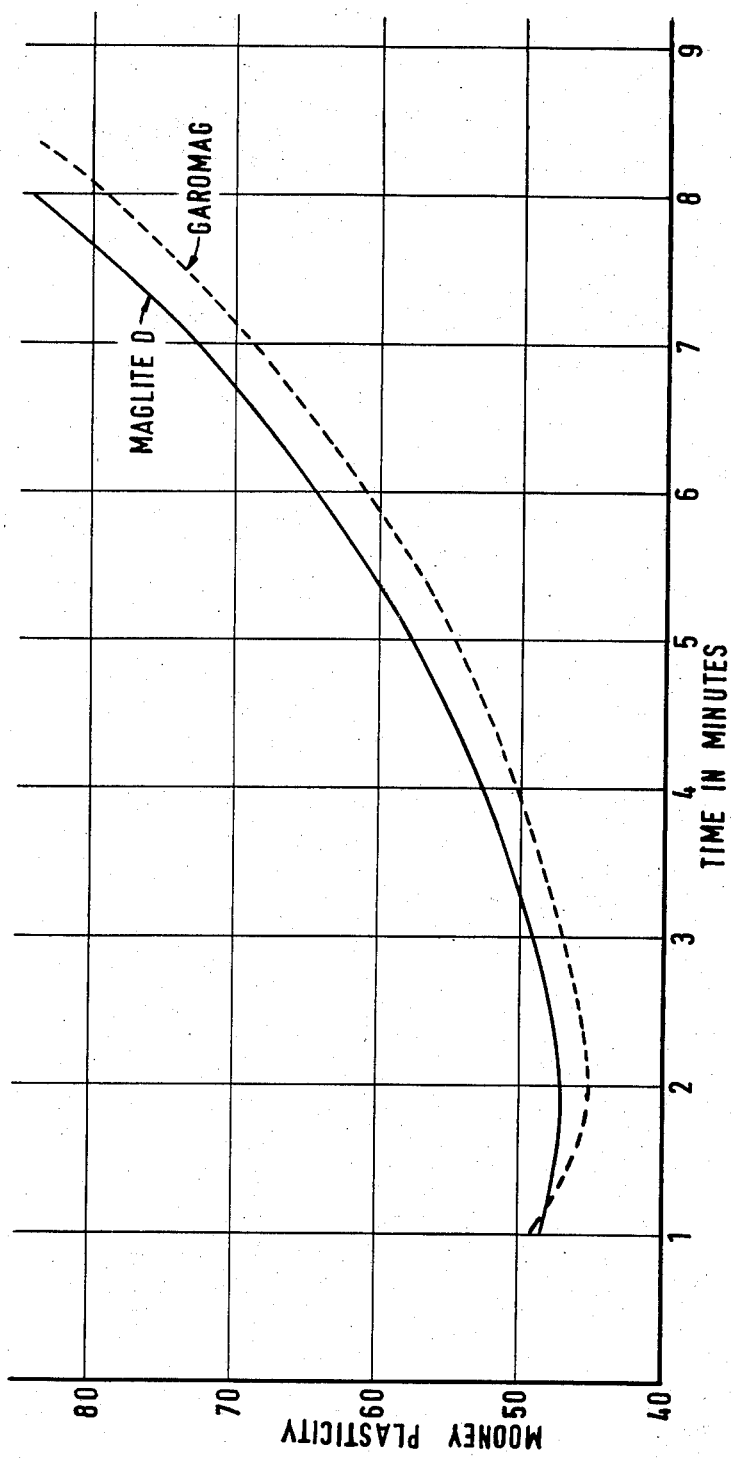
Figure 2:
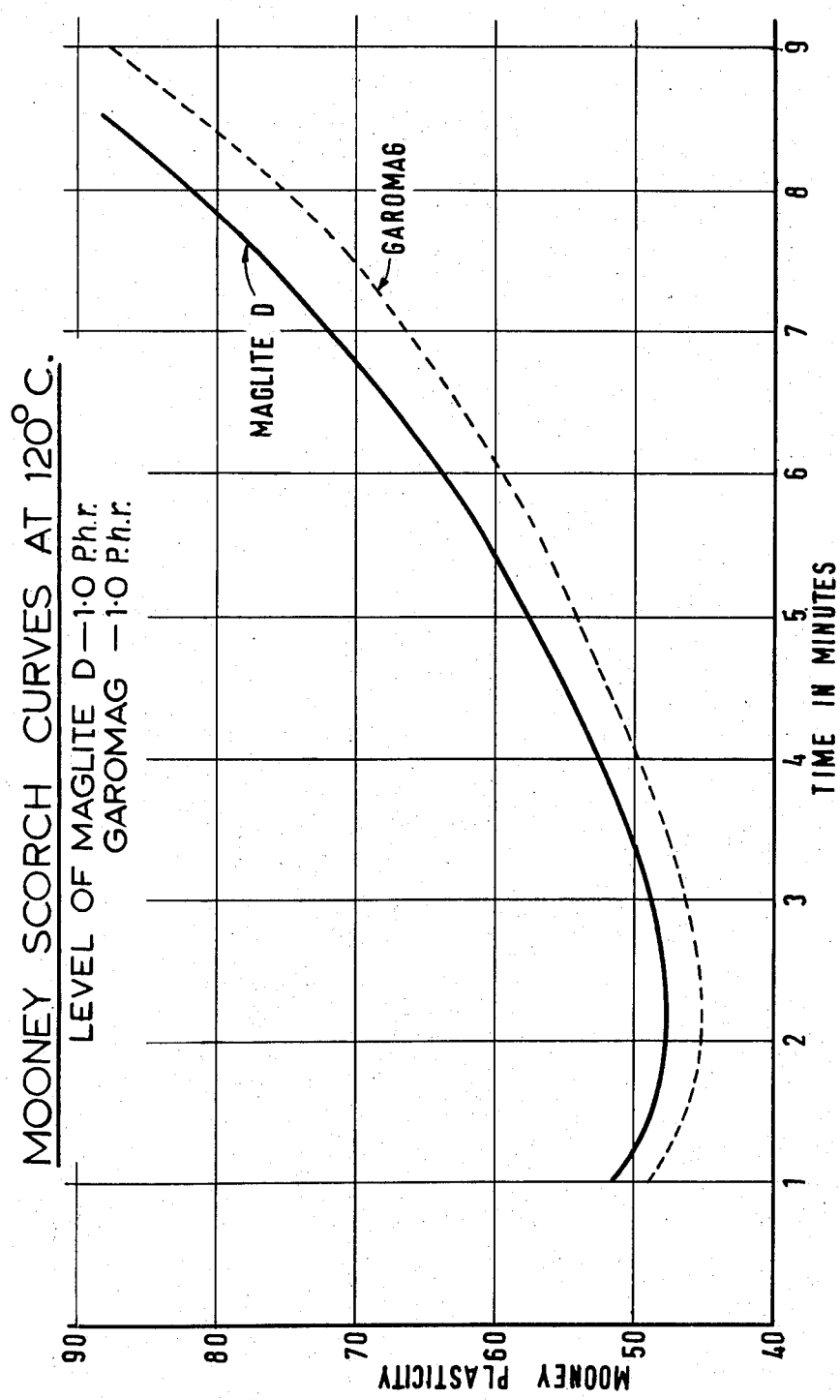
Figure 3:
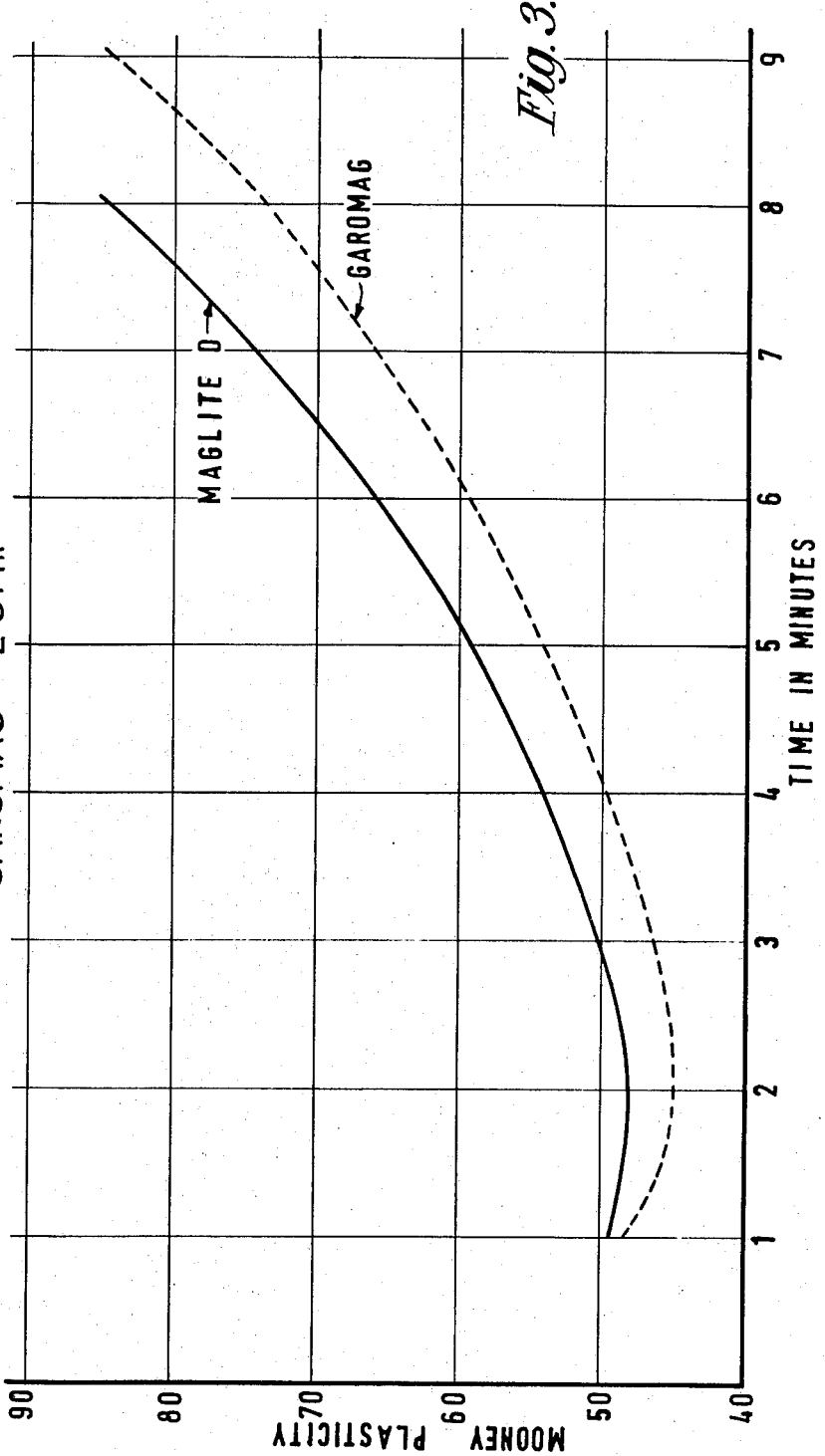
Figure 4:
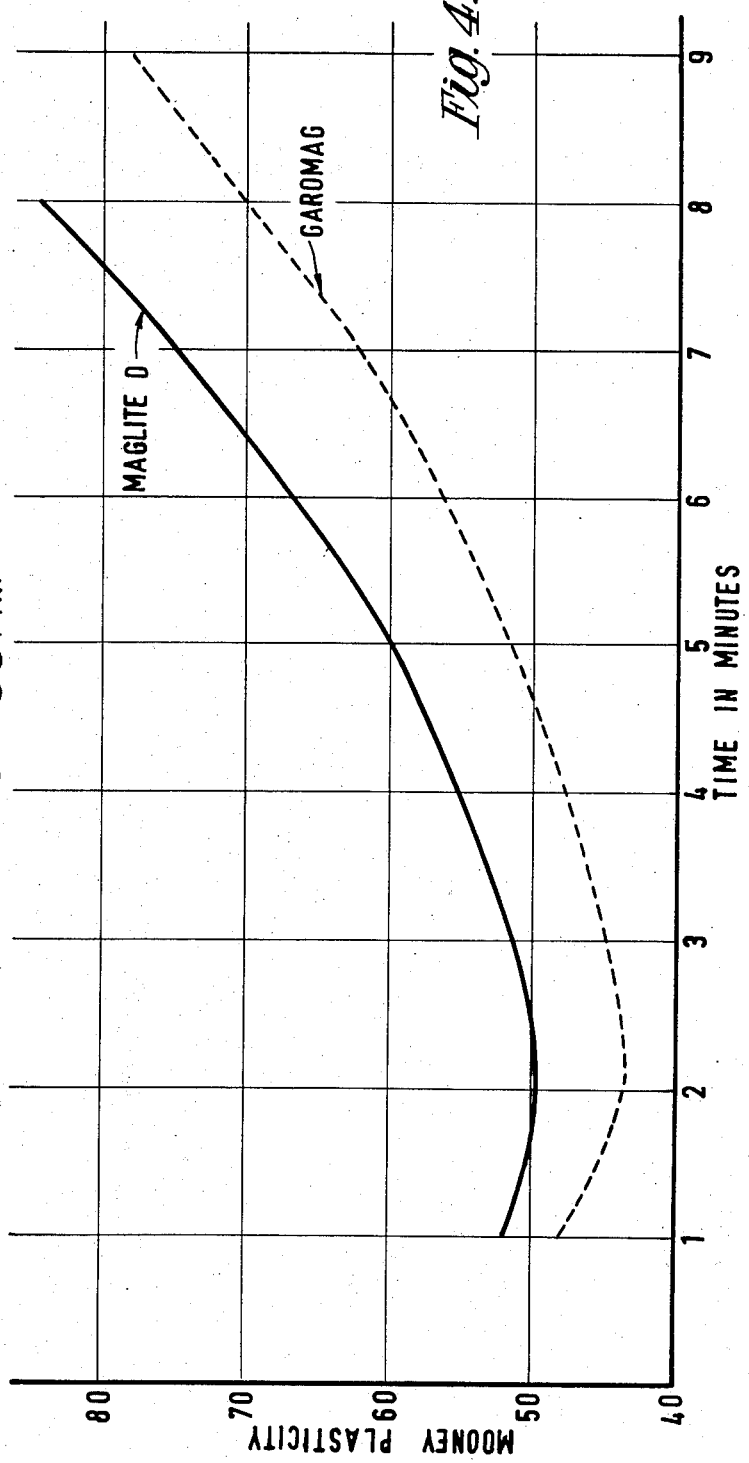
Figure 5:
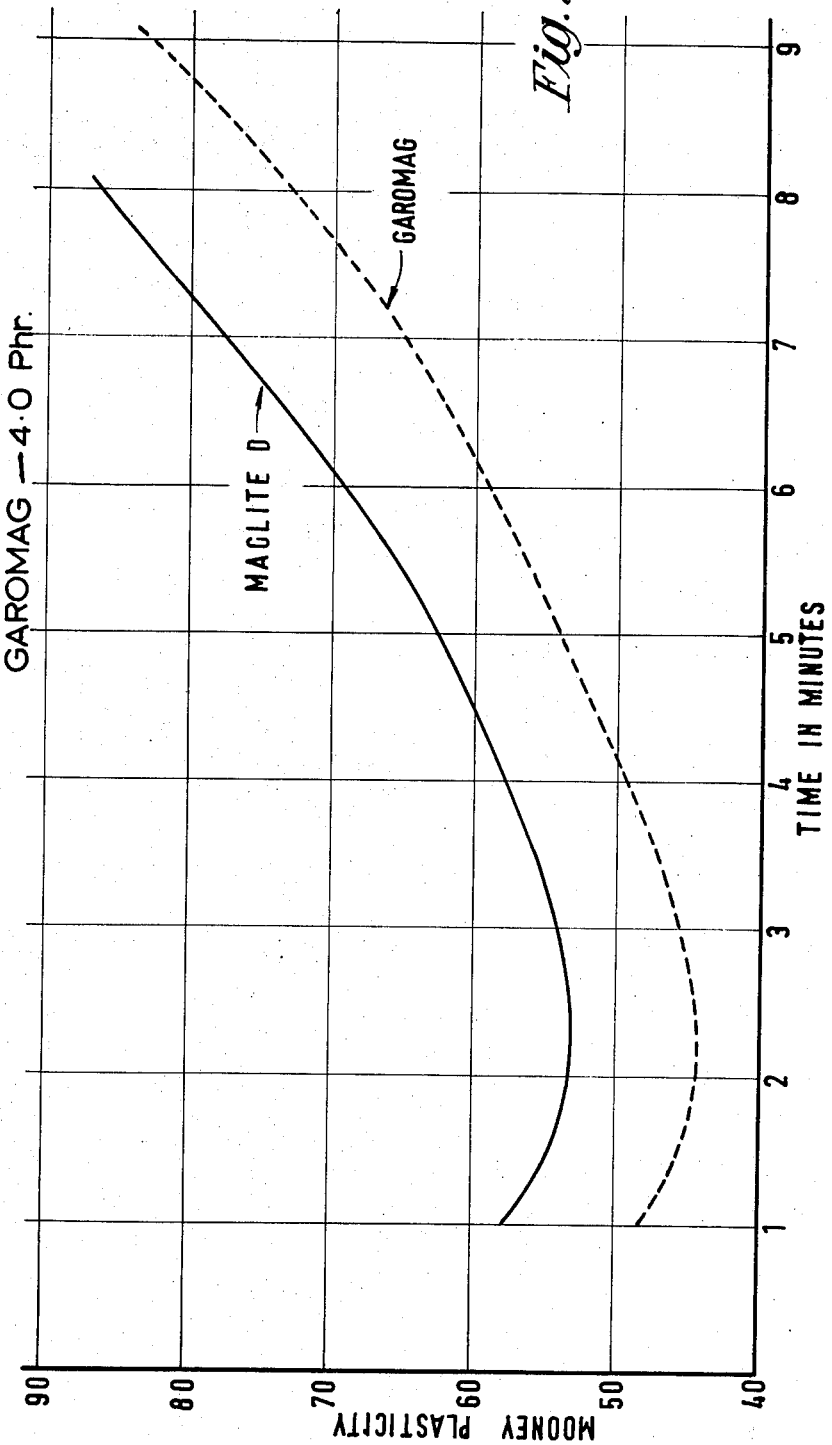

It is known to use magnesium oxide in the processing of polychloroprene rubber for the purpose of preventing the setting up or prevulcanization of the mix as the result of the elevated temperature conditions prevealing during compounding of the rubber. In the unvulcanized compound magnesium oxide acts as a stabilizer preventing stiffening and hardening up of the stock during storage and preliminary treatment of the rubber, e.g. extrusion or moulding, and later, under vulcanizing conditions, it acts in the presence of other metallic oxides as a cross-linking or vulcanizing agent and improves the ageing properties of the finished product.

The magnesium oxide used is generally specially manufactured for the purpose and isan extremely fine powder having a particle size range of up to 50 microns and preferably below 10 microns. Most commonly available grades of magnesium oxide have an average particle size of 1–15 microns but a special grade of magnesium oxide has a much smaller particle size in the range of 0.001 to 0.25 micron. The magnesium oxide is usually compounded in the rubber in powder form but this has several serious draw-backs in practice.

(1) The powder is highly hygroscopic and reacts with moisture in the air losing activity in the container if left open during storage.

(2) The extremely fine powder, which should be so far as possible entirely free from water when incorporated in the rubber, causes a number of difficulties in handling. It flies about in the air, contaminating instruments and equipment and it is a nuisance to the workers themselves.

(3) The powder is usually rather difficult to compound into the rubber and its dispersion is seldom really perfect.

If it is sought to overcome these difficulties by mixing the magnesium oxide with a liquid binder, which normally contains a mineral oil as its main constituent, to a pasty or putty-like consistency, the product sometimes tends to harden and lose its activity as the result of reaction between the oil and the powder. Also the equipment required to make this material and extrude it into a rod shape is expensive and tends to wear out quickly.

The invention provides an additive for incorporation in polychloroprene rubber which comprises a physical mixture of magnesium oxide and an inert diluent powder which is compatible with polychloroprene rubber, the mixture containing 10 to 850 parts by weight of diluent powder per 100 parts by weight of magnesium oxide. Owing to the extreme fineness of the magnesium oxide powder, the diluent powder is almost invariably coarser than the magnesium oxide powder. Indeed the diluent powder preferably has a particle size in the range of 1 to 200 times the particle size of the magnesium oxide powder.

Admixture with the magnesium oxide of the coarser diluent powder considerably reduces the tendency of the magnesium oxide powder to absorb atmospheric moisture and also to fly about in the air. Furthermore, the presence of the diluent powder facilitates uniform dispersion of the particles of magnesium oxide in the rubber partly by extending the magnesium oxide and so presenting it to the rubber in greater volume and partly by increasing the shearing stress in the matrix which is necessary for "grinding-in" and dispersion of the magnesium oxide powder in the rubber.

Preferably the additive contains, in addition to the powders, a liquid non-aqueous binder which may be found in an amount of 1–50% of the weight of the additive. Such binder improves the handling qualities of the additive and also facilitates dispersion of the magnesium oxide in the rubber. If incorporated in an amount of up to 10–50% by weight of the additive it yields a product in which the powder particles are agglomerated to form pellets.

Such pellets, as experiment has shown, absorb only 1% by weight of atmospheric moisture whereas magnesium oxide powder absorbs 20% of moisture under the same conditions.

Preferably, however, the additive is made up in the form of tablets, which will normally contain 10–40% by weight of binder.

The inert diluent powder can be chosen from the more or less inert mineral products that are usually used in such rubber mixes, for example, diatomite, china clay, calcium carbonate, barytes and talcum. Examples of other suitable diluent powders are: ball clay, fuller's earth, dolomite, kieselguhr, lead oxide, finely pulverized siliceous minerals, limestone, magnesium carbonate, and certain powdered synthetic resins, for example polyethylene, phenol formaldehydre, urea formaldehyde and polyvinyl chloride. Two or more different diluent powders may be included in the additive.

Examples of suitable liquid binders are: Mineral oils, soya bean oil, rape seed oil, lecithin, maize oil, palm oil, hydrogenated rosin, butyl oleate, ethylene glycol, polyethylene glycol and its esters, polybutene, esters of phthalic acid and esters of phosphoric acid. In the case of mineral oil it may contain dissolved pitch, rosin or rosin derivatives. Two or more different binders may be included in the additive.

The additive may also contain other ingredients required in the polychloroprene rubber, for example, a plasticizer such as the reaction product of sulphuric acid with an unsaturated paraffin or with a hydrophilic alcohol of high boiling point, or an anti-oxidant, such as a mixture of mono- and diheptyl diphenylamine, tertiary butyl methylphenol, diphenylamine, di-isobutylene reaction product or alkyl aryl phosphates. Plasticizers are normally incorporated in polychloroprene in an amount of up to 10 parts by weight, anti-oxidants in an amount of up to 2 parts by weight and magnesium oxide in an amount of 3 to 4 parts by weight per 100 parts of chloroprene.

Accordingly, these additions can be incorporated in proportions of up to equal weight and more on the weight of magnesium oxide in the tablets. A corresponding amount, i.e., 3 to 4 parts by weight, of the mixed powder may be used.

Tests with the tabletted powders according to the present invention have shown that smaller quantities of magnesium oxide in the diluted blend have an equivalent effect to larger quantities of magnesium oxide powder alone due to the improved dispersion of the magnesium oxide in the rubber compound and apparent synergistic effect. In one typical example, one hundred parts by weight of fine whiting powder were coated with 20 parts by weight of lecithin and 20 parts by weight of mineral oil were mixed with one hundred parts by weight of magnesium oxide powder and tabletted. These tablets when mixed into the rubber compound are equal in effect to the same total weight of pure magnesium oxide powder.

The invention accordingly provides a process for the internal lubrication of polychloroprene rubber which includes the step of incorporating magnesium oxide into the rubber as an additive in any of the forms described above and, in particular, such a process in which the additive is incorporated into the rubber in an amount such that the content of magnesium oxide in the rubber mix amounts only to 0.5 to 3% by weight, and preferably 1 to 2% by weight.

The tablets according to the invention may also contain additives to assist free flow of the mixed powder when the tablets are disintegrated and also to assist in tabletting, for example, methyl cellulose, methyl ethyl cellulose powder, starch or alginic acid.

When, as is preferred, calcium carbonate is used as the diluent powder, it may be in the form of whiting, soft natural chalk, precipitated chalk or a crystalline powdered mineral.

It is preferred so to shape the tablets that they will nest to form a rod shape. Thus protrusions may be formed on one side of each tablet and depressions on the other side these being so disposed that when the tablets are packed the protrusions and depressions on adjoining tablets will fit together to permit of nesting of the tablets.

A preferred additive according to the invention consists of a mixture of 75–15% by weight of magnesium oxide and 25–85% by weight of diluent powder. The particle size of the magnesium oxide may be 0.001 to 50 microns and is preferably 0.001 to 0.25 micron. Such additive may consist of tablets containing 10–40% by weight of binder based on the weight of the powders, the amount of binder within this range being increased with increase in the content of magnesium oxide in the additive.

The following are examples of typical additives according to the invention:

(1)

| | Parts by weight |
|---|---|
| Magnesium oxide powder | 50 |
| China clay powder | 30 |
| Lecithin | 10 |
| Oil | 10 |

(2)

| | |
|---|---|
| Magnesium oxide powder | 45 |
| Dolomite powder | 40 |
| Polyethylene glycol 200 mono-oleate | 5 |
| Oil | 10 |

(3)

| | |
|---|---|
| Magnesium oxide powder | 65 |
| Whiting | 20 |
| Hydrogenated rosin | 5 |
| Oil | 10 |

(4)

| | |
|---|---|
| Magnesium oxide powder | 50 |
| Whiting | 30 |
| Butyl oleate | 5 |
| Oil | 15 |

(5)

| | |
|---|---|
| Magnesium oxide powder | 65 |
| Whiting | 20 |
| Hydrogenated rosin | 5 |
| Oil | 10 |

(6)

| | |
|---|---|
| Magnesium oxide powder | 35 |
| Barytes powder | 50 |
| Polyethylene glycol 400 dioleate | 15 |

(7)

| | |
|---|---|
| Magnesium oxide powder | 20 |
| Kieselghur powder | 65 |
| Polybutene | 10 |
| Polyethylene glycol 200 mono-oleate | 5 |

The oil in the above examples is a medium viscosity naphthenic oil, for instance Gulf Rubber Process Oil, of specific gravity 0.905 at 60° F., viscosity 204 seconds Redwood No. 1 at 70° F. and aniline point 78.9° C. An alternative oil which can be used, provided it is incorporated in the rubber in an amount not exceeding 2.5% by weight of oil, is Shellflex 371, having a specific gravity of 0.9013 at 60° F., viscosity of 420 seconds Redwood No. 1 and aniline point of 207° F.

All of the above formulations can be used without a binder in which case, for example, formulation 1 would consist of 62.5% by weight of magnesium oxide and 37.5% of china clay.

The additives according to the invention should be incorporated in the rubber in the dry state having a moisture content not exceeding 0.50% by weight.

The following are examples of polychloroprene rubbers containing additives in accordance with the invention:

(8)

| | Parts by weight |
|---|---|
| Neoprene GS | 100 |
| Magnesium oxide mixed powder additive (Garomag) | 4 |
| Zinc oxide | 5 |
| NA 22 accelerator | 0.5 |
| HAF black | 40 |
| Stearic acid | 0.5 |
| Paraffin wax | 1.5 |
| Dutrex N (Shell softening oil) | 3 |
| PBN (phenyl betanaphthylamine anti-oxidant) | 1 |

(9)

| | Parts by weight |
|---|---|
| Neoprene GS | 100 |
| Magnesium oxide mixed powder additive (G30, G44 or G60) | 4 |
| Zinc oxide | 5 |
| NA 22 accelerator | 0.25 |
| SRF black | 29 |
| Paraffin wax | 1 |
| Nonox DF (anti-oxidant) | 1 |

Figure 6:
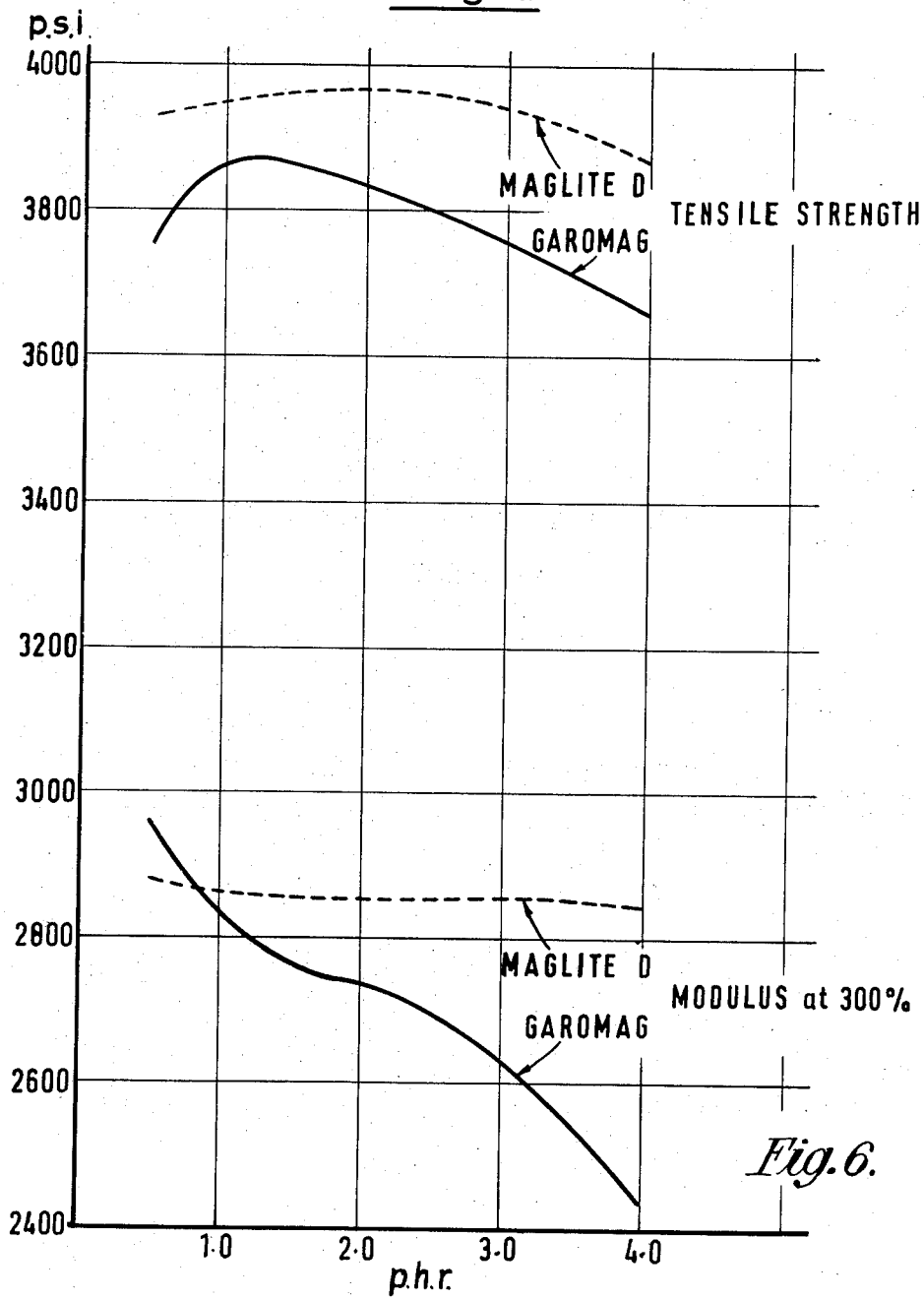
Figure 7:
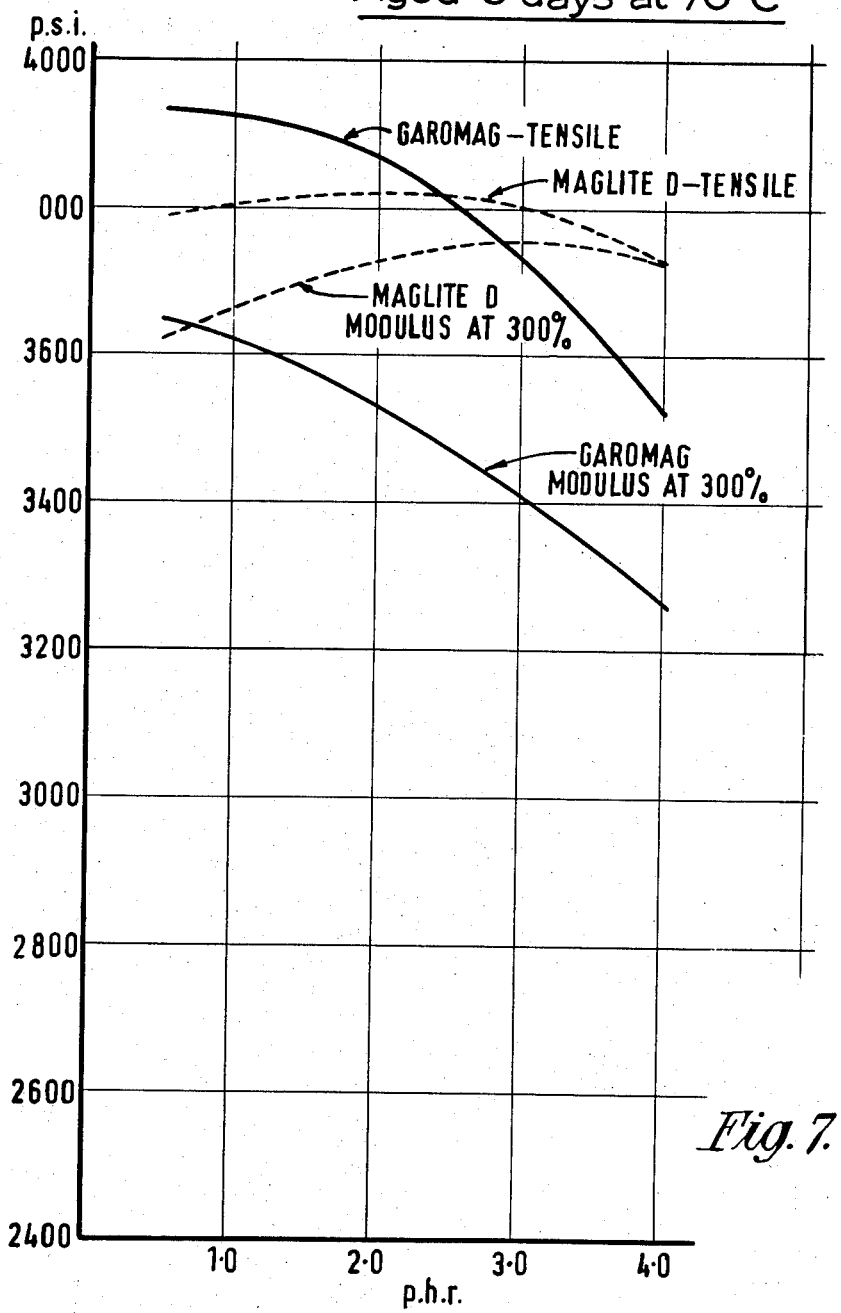
Figure 8:
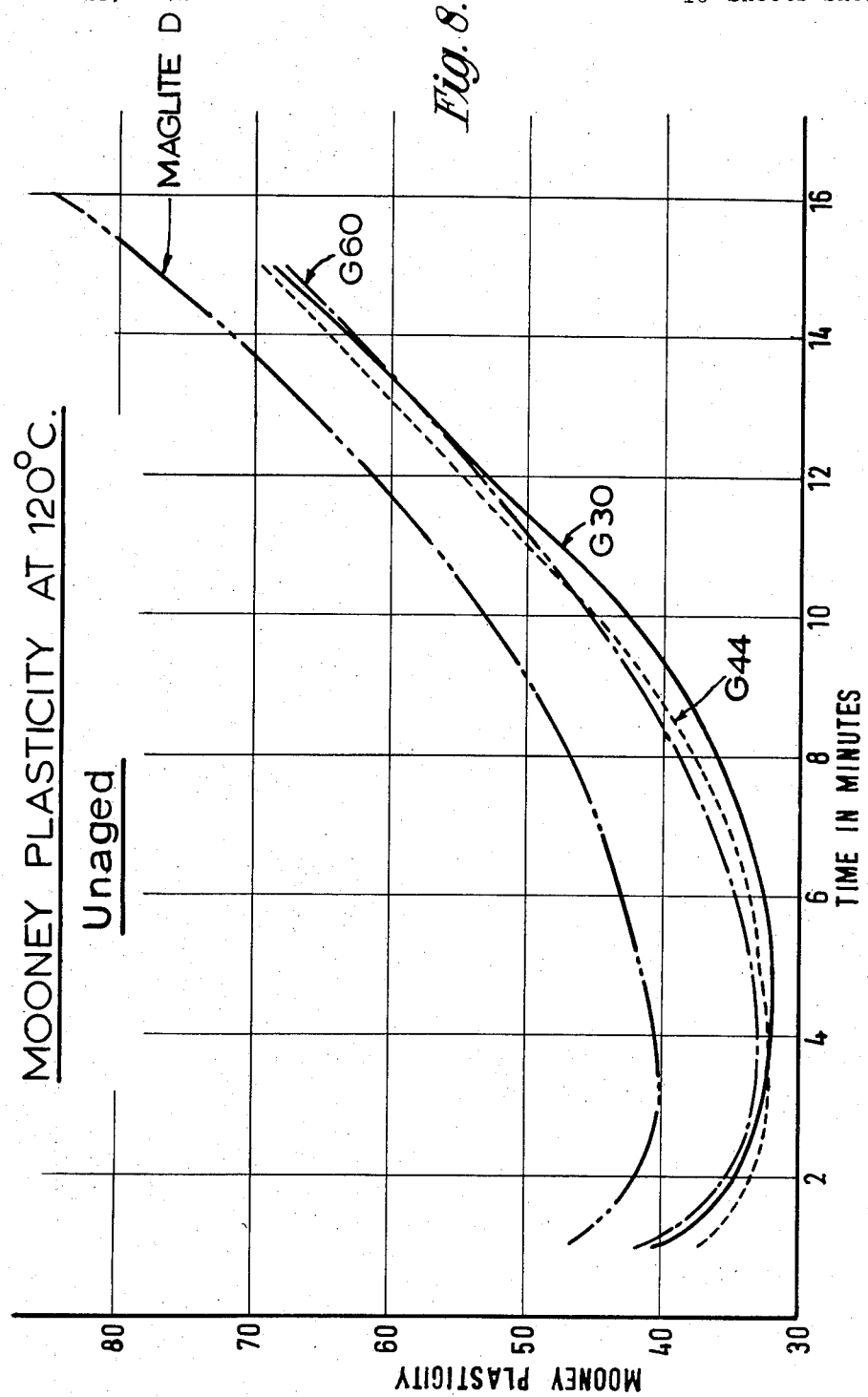
Figure 9:
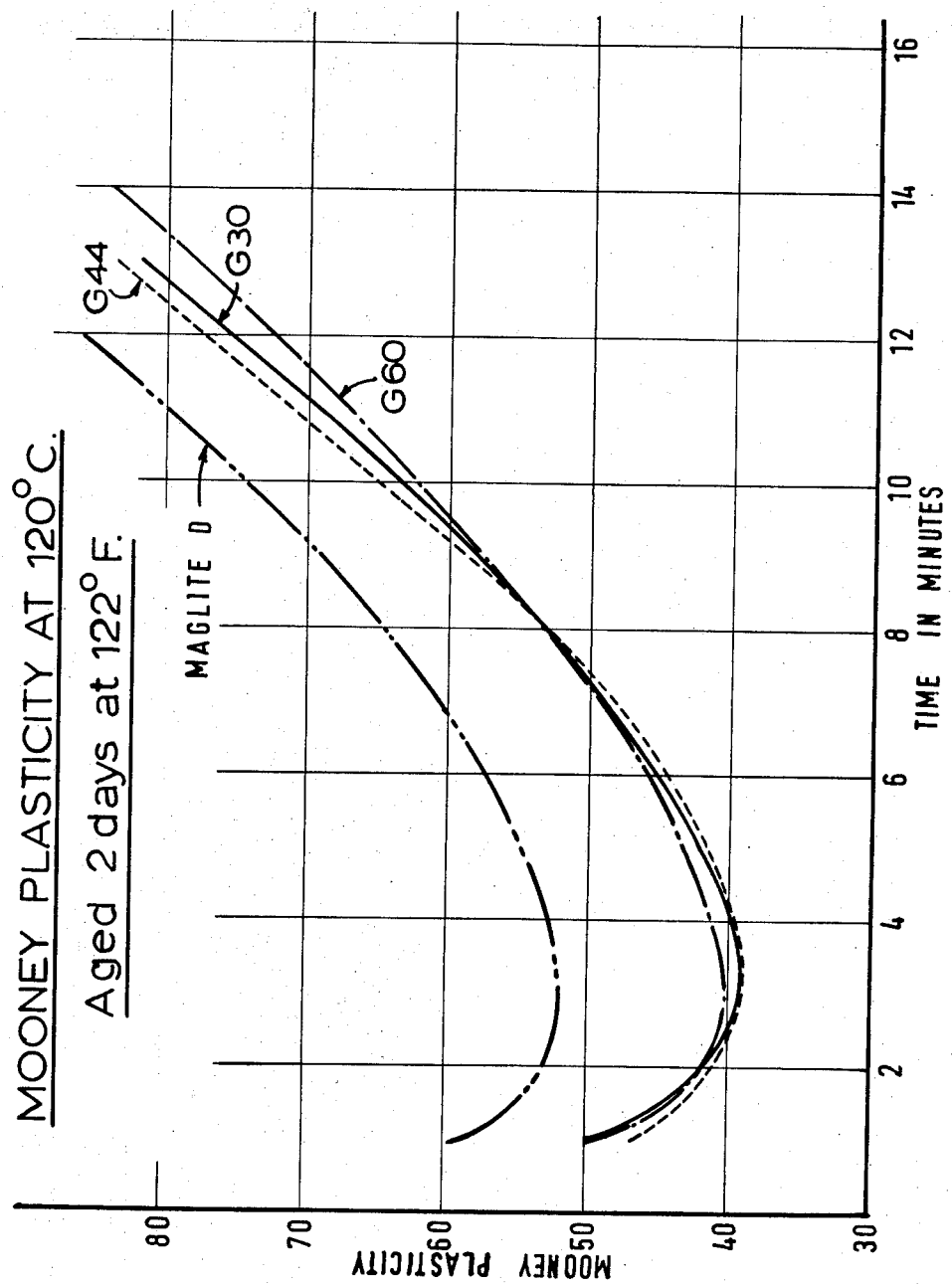
Figure 10:
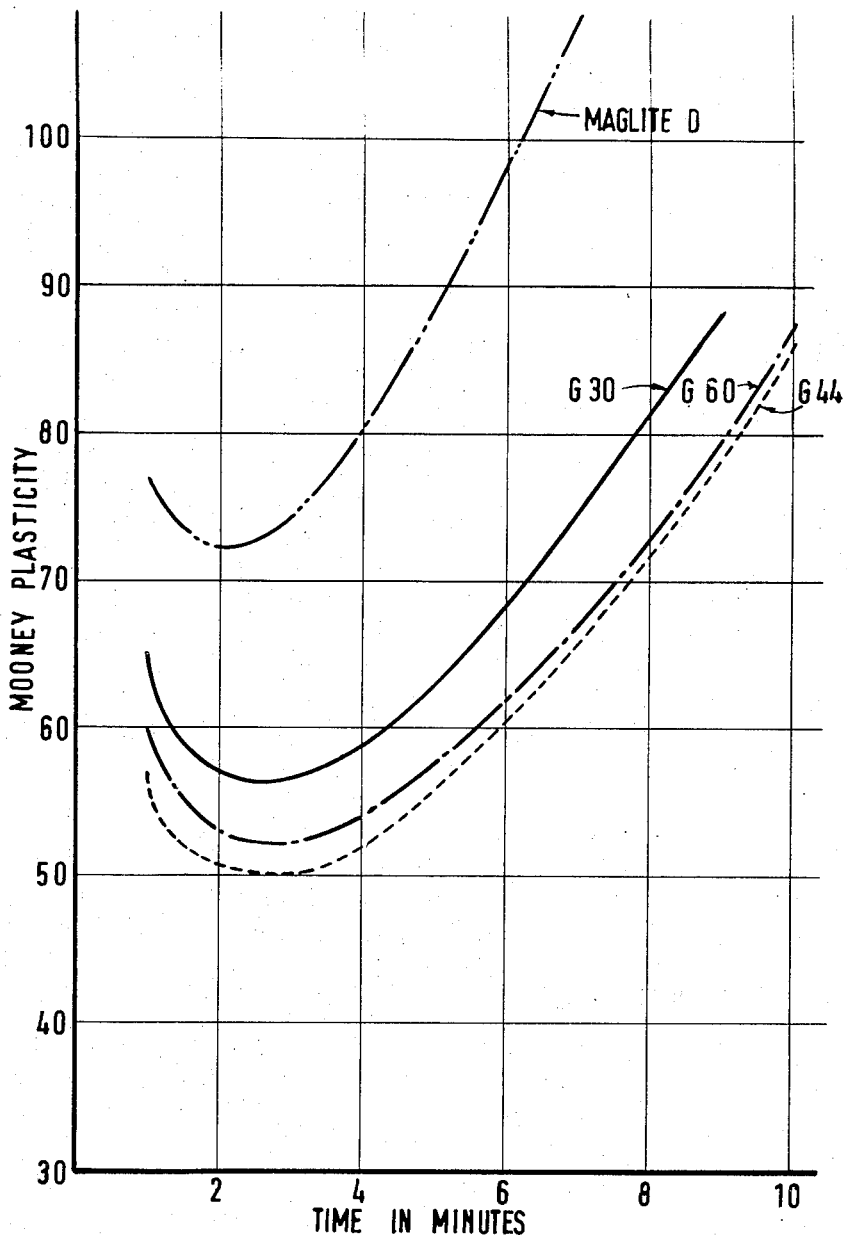

Additives according to the invention also have the advantage that they impart improved physical properties to the rubber as compared with magnesium oxide incorporated as such in the rubber. This will be explained with reference to the accompanying drawings, in which:

FIGS. 1–5 are scorch curves comparing the results achieved with rubber in accordance with Example 8 above and a corresponding standard rubber formulation to which the magnesium oxide was added as such and not in admixture with a diluent powder, the curves showing the effect of variation in the content in the rubber of Garomag additive and of conventional magnesium oxide, FIGS. 6 and 7 are curves showing the effect of ageing on these rubbers, and FIGS. 8–10 are curves comparing rubbers according to Example 9 and containing different additives according to the invention and a corresponding rubber to which magnesium oxide was added as such and without admixture with a diluent powder.

The comparison was made in the case of FIGS. 1–7 between rubber in accordance with Example 8 to which magnesium oxide had been added as such to the rubber, the magnesium oxide being a commercially available product in the form of an extremely fine powder known as Maglite D and having a particle size of 0.001 to 0.25 micron, and rubber to which had been added a corresponding amount of tabletted additive identified as Garomag. This consisted of a mixture of equal weights of Maglite D and powdered chalk to which had been added, prior to tabletting, a liquid binder consisting of 2 parts by weight of mineral oil and 1 part by weight of lecithin, the binder constituting 15% by weight of the product.

FIGS. 1–5 show the Mooney plasticity, measured at 120° C., after varying times of exposure to that temperature, on a Mooney plastometer, of samples of polychloroprene to which had respectively been added Maglite D and Garomag in amounts of 0.5%, 1%, 2%, 3% and 4% by weight of the rubber. As will be seen under the conditions of the test the rubber gradually becomes stiffer with increasing exposure to heat but this tendency is less pronounced with the samples containing Garomag, despite their smaller total content of magnesium oxide, than with those containing Maglite D. Moreover the disparity between the curves in the various graphs increases with the duration of the test and also with the amount of additive in the rubber, being most marked in the test with 4% of additive, i.e. with the conventional amount of magnesium oxide in the case of Maglite D. Since Garomag contains only a small amount of binder the improved softness of the rubber cannot be due to the mere presence of the binder but may be due to a synergistic effect arising from improved presentation of the magnesium oxide to the rubber by the conjoint action of the binder and the diluent powder.

FIGS. 6 and 7 show the tensile strength and modulus at 300% (i.e. the force in pounds/sq. in. required to elongate a specimen by 300%) of specimens of polychloroprene rubber containing various amounts of Maglite D and of Garomag expressed as parts per hundred, i.e. as percentages by weight of the rubber. The results shown in FIG. 6 were for unaged samples while those shown in FIG. 7 were for samples aged for 6 days at 70° C.

The curves in these figures show that, while the samples containing Garomag had a slightly lower tensile strength in the unaged condition the modulus was considerably less. More significant is the fact that the change in tensile strength and modulus is considerably less in the samples containing Garomag. That this is so, will be seen from the following table which also shows the change in elongation at break on ageing.

|  | Parts phr. | Percent Modulus change | Tensile strength change | Elongation change |
| --- | --- | --- | --- | --- |
| Maglite D | 0.5 | +26 | −3.6 | −29 |
|  | 1.0 | +28 | −3.7 | −31 |
|  | 2.0 | +30.5 | −2.7 | −31 |
|  | 3.0 | +32.5 | −3.6 | −34 |
|  | 4.0 | +32.5 | −3.5 | −35 |
| Garomag | 0.5 | +23 | −0.2 | −26 |
|  | 1.0 | +27 | +1.0 | −27 |
|  | 2.0 | +28.5 | +0.9 | −27 |
|  | 3.0 | +28 | +2.0 | −27 |
|  | 4.0 | +35 | −3.7 | −32 |

FIGS. 8–10 show a comparison between rubber according to Example 9 to which 4 parts by weight of magnesium oxide has been added as Maglite D and rubber containing 4 parts by weight of tabletted materials identified as G30, G44 and G60. These were of the following formulation in parts by weight.

|  | G30 | G44 | G60 |
| --- | --- | --- | --- |
| Magnesium oxide, Maglite D | 30 | 44 | 60 |
| Violet Label (Whiting) | 50 | 29.5 | 8 |
| Binder | 20 | 26.5 | 32 |

The binder in each case consisted of a mixture in equal parts by weight of Gulf Oil and lecithin. These curves show the superior performance of the materials G30, G44 and G60 notwithstanding the fact that the total content of magnesium oxide in the rubber was in each case substantially less than in the case of the rubber to which Maglite D alone had been added.

The Mooney plasticity curves at 120° C. for unaged stock shown in FIG. 8 demonstrate that the material containing Maglite D alone had a substantially higher Mooney plasticity than the other rubbers.

Maglite D produces a stiffer stock and the tablets produce a softer stock, the difference being substantially greater than could have been achieved by the physical softening effect of the binder present in the tablets. It is believed that the improved result may be due to a synergistic peptizing effect. FIGS. 9 and 10 show the effects of ageing of the rubber at 122° F. for 2 days and 6 days respectively. It will be noted that ageing has the effect of displacing all the curves vertically, the displacement being greater for the samples containing Maglite D than for those containing the tablets. Particularly significant is the fact that the curve in FIG. 10 for Maglite D is entering the pre-cure or scorch area (100 on the Mooney scale) after a period of six minutes, whereas the materials to which the tablets had been added remain in the unscorched area.

After curing for 17 minutes at 150° C. the materials to which FIGS. 8–10 refer had the following physical properties:

|  | Modulus, 300% | P.s.i., 400% | Tensile strength (p.s.i.) | Percentage elongation at break |
| --- | --- | --- | --- | --- |
| G30 | 1,650 | 2,380 | 3,000 | 490 |
| G44 | 1,680 | 2,395 | 3,120 | 505 |
| G60 | 1,635 | 2,340 | 3,080 | 520 |
| Maglite D | 1,785 | 2,535 | 3,030 | 465 |

As will be seen the stocks obtained with the addition of the tabletted material have only slightly lower moduli than the stock containing Maglite D but have an equal tensile strength, which is the generally accepted criterion for the physical properties of polychloroprene rubbers.

The curves shown in FIGS. 8–10 show that there is very little difference between the effects obtained with G30, G44 and G60, notwithstanding the substantial variation in the content of magnesium oxide in these additives.

A general similar improvement has been observed upon comparison of rubbers to which had been added Maglite D alone and Maglite D in admixture with whiting but with insufficient binder to form tablets. The improved effect of the additives according to the invention has also been noted when magnesium oxide powder of coarser particle size of the order of 45 microns was used.

What I claim as my invention and desire to secure by Letters Patent is:

1. An additive for incorporation in polychloroprene rubber which comprises a physical mixture of 75–15 percent by weight of magnesium oxide and 25–85 percent by weight of an inert diluent powder which is selected from the group consisting of diatomite, china clay, calcium carbonate, barytes, talcum, ball clay, fuller's earth, dolomite, kieselguhr, lead oxide, and magnesium carbonate, said magnesium oxide having a particle size in the range of 0.001–0.25 microns and said diluent powder having a particle size coarser than that of the magnesium oxide.

2. An additive as claimed in claim 1, in which the diluent powder has a particle size in the range of up to 200 times the particle size of the magnesium oxide.

3. An additive as claimed in claim 1, which consists of a mixture of 75-15% by weight of magnesium oxide and 25-85% by weight of diluent powder.

4. An additive as claimed in claim 1, wherein the inert diluent powder is calcium carbonate.

References Cited
UNITED STATES PATENTS

| | | | |
|---|---|---|---|
| 264,214 | 9/1882 | Alsing | 106—306 |
| 802,657 | 10/1905 | Pennock | 106—306 |
| 2,805,955 | 9/1957 | Allen | 106—288 |

OTHER REFERENCES

Twiss, "Importance of Particle Character in a Rubber Pigment," Journal of Oil and Colour Chemists' Association, vol. IX, September 1926, p. 197.

DELBERT E. GANTZ, Primary Examiner
S. L. BERGER, Assistant Examiner

U.S. Cl. X.R.
106—288 B; 260—41.5 R